Oct. 18, 1966

W. L. HALEY ETAL
SAMPLE TAKING DEVICE 3,279,259

Filed July 12, 1965

WILLIAM L. HALEY
DEWEY H. ROBBINS
EDWARD J. THOMPSON
JOHN S. THURLOW   *INVENTORS.*

BY *Seed & Berry*

*ATTORNEYS*

Oct. 18, 1966   W. L. HALEY ETAL   3,279,259
SAMPLE TAKING DEVICE

Filed July 12, 1965   3 Sheets-Sheet 2

WILLIAM L. HALEY
DEWEY H. ROBBINS
EDWARD J. THOMPSON
JOHN S. THURLOW
*INVENTORS*

BY *Seed Berry*

ATTORNEYS

Oct. 18, 1966  W. L. HALEY ETAL  3,279,259
SAMPLE TAKING DEVICE
Filed July 12, 1965  3 Sheets-Sheet 3
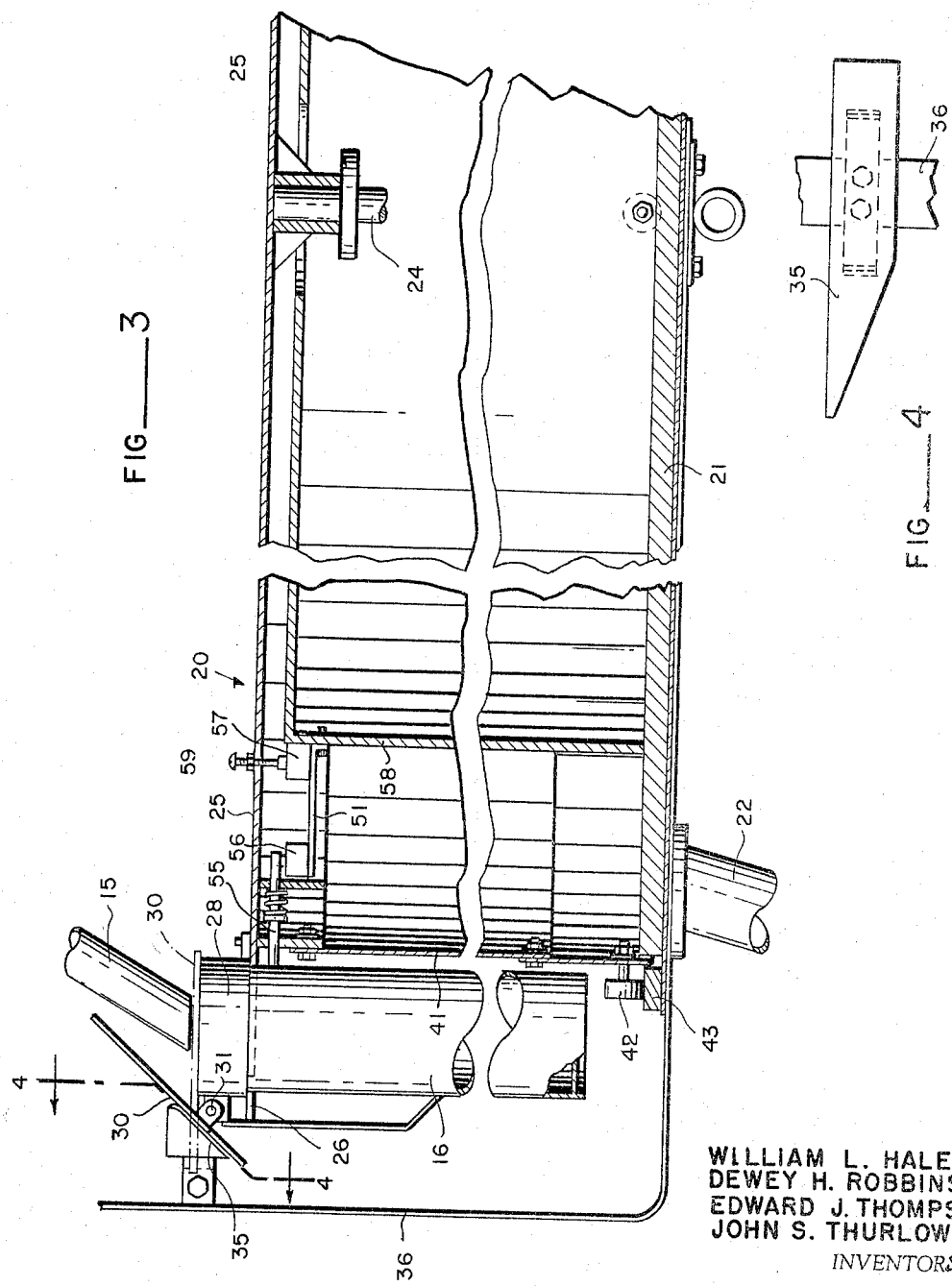
WILLIAM L. HALEY
DEWEY H. ROBBINS
EDWARD J. THOMPSON
JOHN S. THURLOW
INVENTORS.
BY Seed & Berry
ATTORNEYS United States Patent Office 3,279,259
Patented Oct. 18, 1966

3,279,259
SAMPLE TAKING DEVICE
William L. Haley, Dewey H. Robbins, Edward Jaye Thompson, and John Stephen Thurlow, all of Seattle, Wash., assignors to Fisher Flouring Mills Co., Seattle, Wash.
Filed July 12, 1965, Ser. No. 473,566
6 Claims. (Cl. 73—421)

This invention relates to the systematic taking of sample quantities of a material such as processed grain, or the like, as it is discharged from a storage bin or hopper, into individual bags, packages or containers in which it is sealed for distribution to consumers. This application is a continuation-in-part of copending application Serial Number 303,348, filed August 20, 1963, now abandoned.

One of the reasons for the present invention resides in the fact that wheat is being processed in large quantities in the United States as Bulgar for export and for convenience in handling the distribtuion, the Bulgar is packaged or bagged in predetermined, measured amounts. However, it is a requirement, according to regulations of the United States Department of Agriculture, that prior to the shipment of this processed product from the United States, it must meet certain tests and standards to determine its quality and safety for its intended use. Prior to use of the present invention, such testing has required that measured samples of the processed grain be taken from the sealed packages or bags, and that these samples be subjected to the prescribed tests. This procedure in sample taking has required that sealed containers be opened and that, after the samples have been taken therefrom, that they be reclosed or sealed. Manifestly, the requirement for opening and then reclosing of containers for sampling is an impractical, time-consuming and expensive operation.

In view of the above explanatory statement, it has been the principal object of this invention to provide a more practical, reliable, less expensive and faster means and procedure for the required sample taking operation.

A further object is to provide a practical means for taking a sample corresponding to the material packaged in each container, and for easily varying and controlling the size of each sample.

Further objects and advantages of the invention reside in the details of construction of the various parts and devices employed in the operation of the present sampling system, in their specific combination or relationship and in the particular mode of operation of the system for the accomplishment of the objects herein stated.

In accomplishing the above mentioned and various other objects of the invention, I have provided the improved details of construction, the present preferred forms of which are illustrated in the accompanying drawings, wherein:

FIG. 3 is an enlarged vertical sectional detail of a portion of the sample receptacle mounting and indexing turret with a sample receptacle as removably mounted thereon in position for reception of samples.

FIG. 4 is an elevation of the cam plate member employed for actuating the lid of each sample receptacle to open position as the receptacles are moved successively into sample receiving position by the supporting turret.

Figure 1:
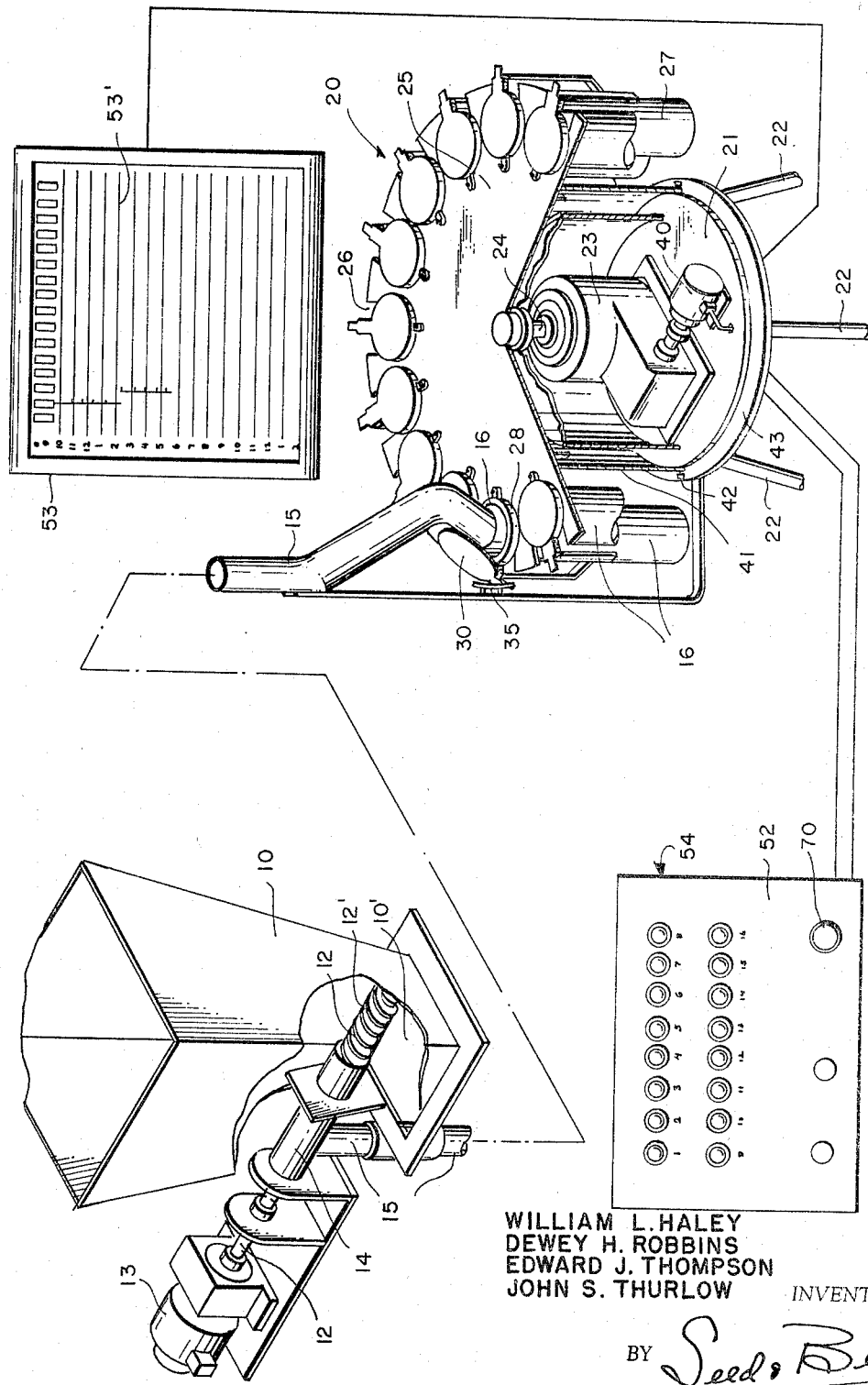
FIG. 1 is a schematic showing of the present system, as designed for the taking of samples from the discharge end of a storage hopper and for the discharge of the individual samples as taken, to a receiving receptacle mounted by the indexing turret.
Figure 2:
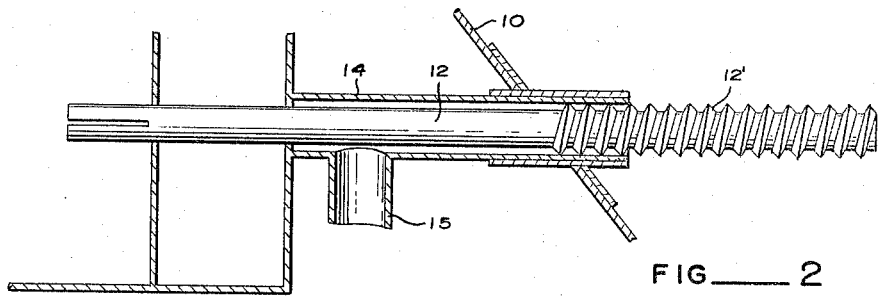
FIG. 2 is a fragmental, sectional detail showing a part of the sample taking screw shaft and a portion of the sample discharge tube.

Referring more in detail to the drawings:

Referring to FIG. 1 reference numeral 10 designates the lower or egress portion of a storage bin or hopper from which grain or other granular material discharges at 10' into a suitable automatic weighing machine (not shown) such, for example, as disclosed in Patent No. 2,332,438, which delivers predetermined amounts of the material for packaging in bags or other suitable containers. In such a weighing machine a feeder loads a weigh hopper until a predetermined hopper load is reached, and the feeder cannot start again until the weigh hopper is dumped. The packaging operation can be manual, i.e., a worker successively places the mouths of the bags around a spout discharging from the weigh hopper; or the weighing machine can be connected to an automatic bagger. In either instance, as part of the present invention a switch 71 for initiating sampling is associated with the weighing machine controls or other mechanism such that each time the weigh hopper is emptied the switch is momentarily closed. For example, in the case of manual bagging, the switch 71 can be coupled with the switch which the operator presses to open the discharge door of the weigh hopper. In this manner, a sample is taken for each bag of the material.

Continuing to the sampling mechanism controlled by the switch 71, such includes a small diameter sample taking screw shaft 12 which projects into the hopper 10 adjacent the discharge opening 10' and is driven through a suitable gear reduction unit by an electric motor 13. The direction of rotation of the rotation of the screw shaft 12 is such as to cause the screw thread 12', with each period of operation of the shaft, to move a certain amount of grain as a sample outwardly from the hopper, and to advance it through a tubular sleeve 14 that axially contains the shaft, to the entrance of a discharge tube 15. This tube leads directly downward from the sleeve 14 to discharge the sample by gravity flow to a sample receptacle 16 mounted on a turret device which, in FIG. 1, has been designated in its entirety by reference numeral 20. This turret may be in a sealed room remote from the hopper 10.

The turret device 20 comprises a base or table 21 supported by suitable legs 22. Mounted on this table 21 is a gear housing 23 from which a vertical rotatably mounted shaft 24 extends and at its top end mounts a turret disc 25 of circular form and of substantial diameter. This turret disc is provided in its peripheral portion, at regularly spaced intervals, with outwardly opening recesses or pockets 26 into and from which the upper end portions of a plurality of the cylindrical sample receptacles 16 may be individually received for their support, conveyance and easy removal.

As best seen in FIG. 3, each of the suspended receptacles 16 has a collar 28 applied thereto about its upper end portion. Also, each receptacle has an upwardly opening lid 30 pivoted, as at 31, to the collar for hinging movement between an open position, as shown in full lines in FIG. 3, and a closed position, as seen in dash lines in the same view.

The discharge end of the sample delivery tube 15 terminates in a position for discharge of samples therefrom into the receptacles as they are successively brought into sample receiving position. When a predetermined number of samples have been taken from a batch of processed grain, and discharged to a receptacle, the turret is indexed forwardly to bring the next receptacle into position to receive the samples from tube 15. This indexing is under push button control as later explained.

With the indexing movement of the turret disc 25 that brings a following receptacle 16 into receiving position, the lid 30 of the receptacle is actuated to its open position of FIG. 3 and the lid of the preceding receptacle drops to its closed position. The lids are successively opened by a cam plate 35, shown in FIG. 4, which is supported from a stationary member 36 carried by a bracket arm extended from the turret supporting table 21. With each indexing movement of the turret, the opened cover of the advanced container drops by gravity to a closed position to protect its contained samples.

The turret indexing movement is effected by an electric motor 40 that is mounted on the turret base 21 and which operates through gearing in the gear case 23 to rotatably advance a shaft 24 and turret disc 25 the predetermined interval. The energizing of motor 40 is under control of means presently to be described in connection with the push button operation mentioned above and the explanation of the wiring diagram of FIG. 5.

It is further to be explained that the turret disc 25 is provided with a cylindrical side wall apron 41 that is fixed thereto and extends downwardly therefrom, as in FIG. 3, concentric with shaft 24. This side wall enclosing apron is provided at spaced intervals about its lower edge with rollers 42 for travel on a trackway 43 formed about or as a port of the base structure 21 for rolling support of the turret and its supported receptacles 16.

Figure 5:
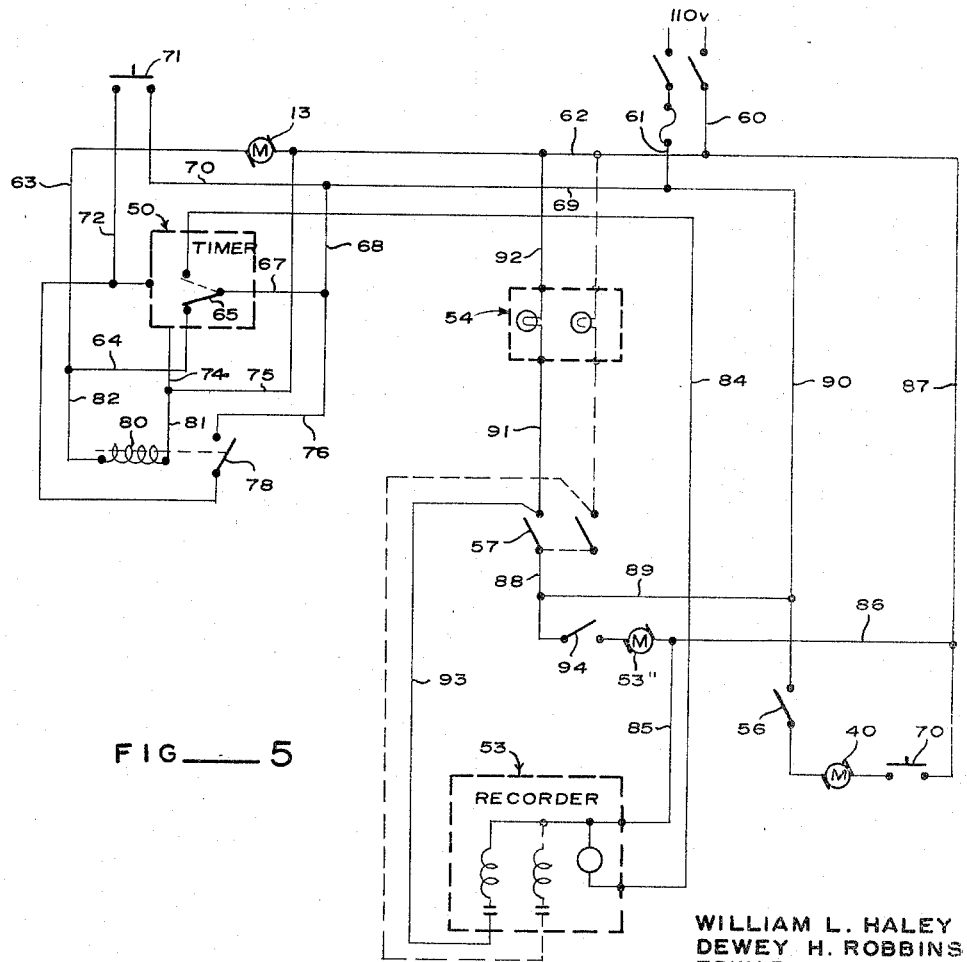
FIG. 5 is a wiring diagram for controlling the electrical components of the system.

Other elements of the combination employed in the present system, as disclosed in FIG. 1, and in the diagram of circuitry seen in FIG. 5, includes a variable timing device 50 for establishing the period of time that the sample taking screw shaft 12 is to run for the taking of each sample, such period determining the size of the sample; a push button board 52, preferably located at the bagging station for convenient control by the bag filling operator to effect the forward indexing of the turret at completion of each lot run of samples; a recorder 53 including a moving tape 53' and pens positioned to leave an inked record of the sample taking runs of shafts 12; and an indicating light panel 54 that indicates which of the sample receptacles 16 is receiving samples at any given time.

It will also be observed by reference to FIG. 3, that as each receptacle 16 is brought by the turret into sample receiving position, it engages and actuates a spring pressed push rod 55 to cause it actuate stationary micro-switch 56 which is supported from a bracket 51 attached to a non-rotating drum member 58 of the turret. The function of this micro-switch is to stop the motor 40 each time that it operates to bring the receptacles 16 into sample receiving position. If it should happen that any receptacle 16 was missing from the turret 26, the motor 40 would continue to turn the turret until the next receptacle is brought into sampling position before the motor is stopped by the limit switch 56.

Also to be noted from FIG. 3 is that for each container 16 positioned on the turret 25 there is a respective microswitch 57 mounted on the stationary drum 58. As the turrent 25 revolves, these switches are successively engaged by a turret-carried set screw 59 thus to actuate the switch corresponding to the receptacle then receiving sample grain, to close a circuit to a corresponding lamp on switch board 52 so that the operator can tell which receptacle 16 is receiving the samples.

Referring to FIG. 5, electric current is supplied to the mechanism through power lead 60–61. The sampler motor 13 is connected to power lead 60 by lead 62, and to power lead 61 by leads 63–64, a switch 65 controlled by the timer 50, and leads 67–69. Thus in order for the sampler motor 13 to be energized, the timer switch 65 must be closed in the downward direction as viewed in FIG. 5. Activation of the timer 50 is controlled by the switch 71 at the weighing machine to the end that each time a bag is filled, a sample of predetermined size will be taken of the material which will be in the next bag to be filled. The switch 71 connects by leads 69–70 with the power lead 61 and by lead 72 with one side of the timer while the other side of the timer connects to the other power lead 60 by leads 74–75 and 62. With this arrangement the sampler motor 13 is started responsive to momentary closing of the activating switch 71 and continues to run until the timer mechanism causes the switch 65 to move from its downward position in FIG. 5 to the upper broken line position.

Wired in parallel by leads 68, 76 and by lead 77, with the activating switch 71, is the switch 78 of a relay 80. The coil of this relay is in turn wired in parallel with the sample motor 13 by leads 75, 81 and 63, 82. Hence, whenever the activating switch 71 is momentarily closed, the timer is locked in by the relay switch 78. This lock-in is maintained until the present timer period has expired, whereupon the timer switch 65 moves to the upper position in FIG. 5. This breaks the power circuit to the sampler motor 13 and to the relay coil 78, thereby opening the relay switch 78 and hence deactivating the timer 66.

With the timer switch 65 in its upward position, the recorder 53 is energized by leads 85–87 to power lead 60, and by leads 69, 68, 67, switch 65, and lead 84 from power lead 61. The recorder has a pen for each sample receptacle 16, the light panel 54 has a light for each receptacle, and there is a limit switch 57 for each panel. One side of the limit switches 57 are connected by leads 88–90 to power lead 61 and from the other side of the limit switches a respective lead 91 continues to each of the lights, the light circuit being completed by leads 92, 62 to the power lead 60. Thus, an indicator light can only be on when its respective limit switch 57 is closed. Similarly, each of the pen actuators in the recorder 53 connects by a respective lead 93 with one of the limit switches 57 so that it can only be actuated when the corresponding limit switch is closed.

The turn table motor 40 may be equipped with a magnetic starter actuated by switch 70 and remains operating only while limit switch 56 in series therewith remains closed. The chart 53' is operated by a motor 53" shown in FIG. 5 as connecting by leads 86, 87 with power lead 60, and by leads 89, 90 with power lead 61. This chart motor operates constantly after closing of a switch 94.

The sampling screw 12' is located close enough to the hopper outlet 10' to project within the portion of grain which will discharge from the hopper into the weighing machine, on the next cycle thereof. The size of each sample depends upon the number of revolutions of the shaft 12 during each sample taking period. Timer 50 is adjustable for varying the sample taking period at will and hence with a constant speed motor 13, the size of each sample can be predetermined by the timer setting. The feed screw 12' is of low capacity so that several revolutions thereof extracts a sample which is minute compared to the amount of product in each bag. In operation it is preferred to place all of the samples for a multibag lot in a single one of the sample storage receptacles. Because of the adjustability of the size of samples per bag by setting of the timer, it is possible to take a total sample per lot of about two quarts, even though the total lot to be sampled may vary in quantity from 100 to 1000 sacks.

After the sampling of a lot, the operator pushes button 70 to advance the turret 20 to the next sample receptacle 16. The light panel 54 then tells the operator that the receptacle advance has occurred. During all of the operation the recorder 53 keeps a permanent time record showing the total samples taken during each lot.

The sample storage can occur in a sealed room remote from the bagging site so that inspectors can periodically check the quality, of each bag in each lot, without fear of tampering and without need of opening any of the bags.

We claim:

1. In combination, a holding bin for granular material, discharge means for delivering a charge of the material from the bin for packaging thereof, screw sampler means for delivering samples of said material from the bin to a point outside of the bin, the capacity of said screw sampler means being very small as compared to said charge, and control means for operating said screw sampler means for a preset period of time determining the size of sample extracted thereby from the bin.

2. In combination, a holding bin for granular material, discharge means for delivering a charge of the material from the bin for packaging thereof, a sample storage station remote from said bin and having an inlet duct, screw sampler means for delivering samples of said material from the bin to said duct, the capacity of said screw sampler means being very small as compared to said charge, and control means for operating said screw sampler means once per charge of material for a preset period of time determining the size of such sample extracted.

3. In combination, a holding bin for granular material to be packaged, weighing means for delivering charges of material from said bin to a packaging station, screw sampler means extending from a sample taking point within said bin to a sample discharge point outside of said bin for taking samples of said material which are very small relative to each of said charges, and timer means for operating said sampler means for a preset period of time determining the size of sample extracted thereby from the bin, and control means for activating said sampler means each time said weighing means operates.

4. In combination, a holding bin for granular material, a packaging station, a sample storage station remote from said bin and from said packaging station having a sample delivery tube thereto, a turret in said sample storage station removably holding a plurality of sample receptacles, normally inactive drive means for intermittently turning said turret and successively advancing said sample receptacles beneath said sample delivery tube after a predetermined plurality of samples have been delivered to each receptacle, discharge means for delivering a charge of the material from the bin to the packaging station, screw sampler means extending from within said bin for delivering samples of the material to be packaged to the sample delivery tube, the capacity of said screw sampler means being very small as compared to said charge, and control means for operating said screw means once per charge of material for a preset period of time determining the size of each sample extracted and for periodically activating said turret drive means.

5. In combination with the structure of claim 4, an electrically driven recording tape, and means for indicating on said tape the identity of the respective receptacle receiving the sample.

6. In combination, a holding bin for granular material, a packaging station, discharge means for delivering a charge of the material from the bin to the packaging station, a sample storage station remote from said bin and from said packaging station, screw sampler means extending from within the bin for delivering samples of the material to be packaged to the sample storage station, the capacity of said screw sampler means being very small as compared to said charge, and the location of the screw sampler means being such that each sample is taken thereby from material which will constitute the next charge of material discharged, and control means for automatically operating said screw sampler means once per charge of material for a preset period of time determining the size of sample extracted.

References Cited by the Examiner
UNITED STATES PATENTS

| 1,101,568 | 6/1914 | Roberts | 73—421 |
| 2,778,387 | 1/1957 | Diekl | 222—70 |
| 2,893,602 | 7/1959 | Barber | 73—423 |
| 2,968,948 | 1/1961 | Rose | 73—421 |

FOREIGN PATENTS

| 224,712 | 3/1943 | Switzerland. |

LOUIS R. PRINCE, *Primary Examiner.*

S. CLEMENT SWISHER, *Assistant Examiner.*